(12) United States Patent
Wan et al.

(10) Patent No.: US 7,715,710 B2
(45) Date of Patent: May 11, 2010

(54) METHOD AND SYSTEM FOR POWER MANAGEMENT IN OPTICAL NETWORKS

(75) Inventors: Ping Wai Wan, Ottawa (CA); Derrick Remedios, Ottawa (CA)

(73) Assignee: Alcatel Lucent, Paris (FR)

( * ) Notice: Subject to any disclaimer, the term of this patent is extended or adjusted under 35 U.S.C. 154(b) by 358 days.

(21) Appl. No.: 11/754,675

(22) Filed: May 29, 2007

(65) Prior Publication Data
US 2007/0280687 A1   Dec. 6, 2007

Related U.S. Application Data

(60) Provisional application No. 60/808,975, filed on May 30, 2006.

(51) Int. Cl.
*H04B 10/08* (2006.01)
(52) U.S. Cl. .......................... 398/38; 398/33; 398/177; 398/181; 398/158; 398/159; 385/24; 385/48; 385/39
(58) Field of Classification Search ............... 398/38, 398/79, 147, 158, 159, 160, 33, 30, 31, 197, 398/177, 181, 32, 185, 183; 385/24, 48, 385/39
See application file for complete search history.

(56) References Cited

U.S. PATENT DOCUMENTS 6,842,561 B2 *   1/2005   Mak et al. ..................... 385/24

| | | | |
|---|---|---|---|
| 7,054,556 B2 | 5/2006 | Wan et al. | |
| 7,127,165 B2 | 10/2006 | Obeda et al. | |
| 7,139,486 B2 | 11/2006 | Wan et al. | |
| 7,142,783 B2 | 11/2006 | Obeda et al. | |
| 2003/0020995 A1* | 1/2003 | Harasawa | .................... 359/179 |
| 2004/0032643 A1 | 2/2004 | Chimfwembe | |
| 2005/0002677 A1 | 1/2005 | McAllister | |

FOREIGN PATENT DOCUMENTS

EP           1564913           8/2005

* cited by examiner

*Primary Examiner*—Hanh Phan
(74) *Attorney, Agent, or Firm*—IP-MEX Inc.; Victoria Donnelly

(57) ABSTRACT

Methods and apparatus for optical-power control in an optical network employing wavelength-division multiplexed (WDM) optical-fiber links are devised to circumvent the effect of crosstalk caused by optical-power scattering. Each carrier signal is amplitude-modulated by an identifying tone, with the power of an identifying tone having a predetermined ratio to the power of its carrier signal. A fiber span within an optical-fiber link is tapped at a preferred monitoring point, and the power spectrum of the envelope of the tapped optical signal is measured. To estimate an individual carrier power, a temporary gain is applied and the power of a corresponding tone is measured. To control optical power of each wavelength carrier in several spans in the network, a network controller selects an order of processing the spans of interest, and selects the order of processing of each channel within each span.

31 Claims, 15 Drawing Sheets

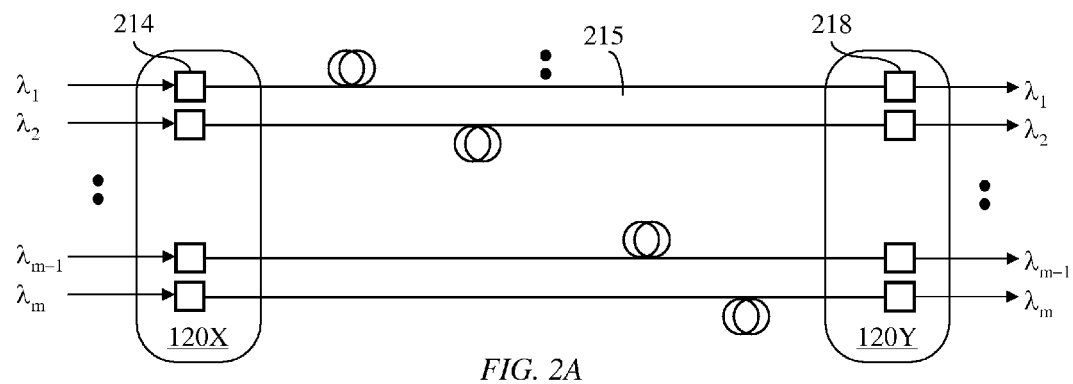
FIG. 2A
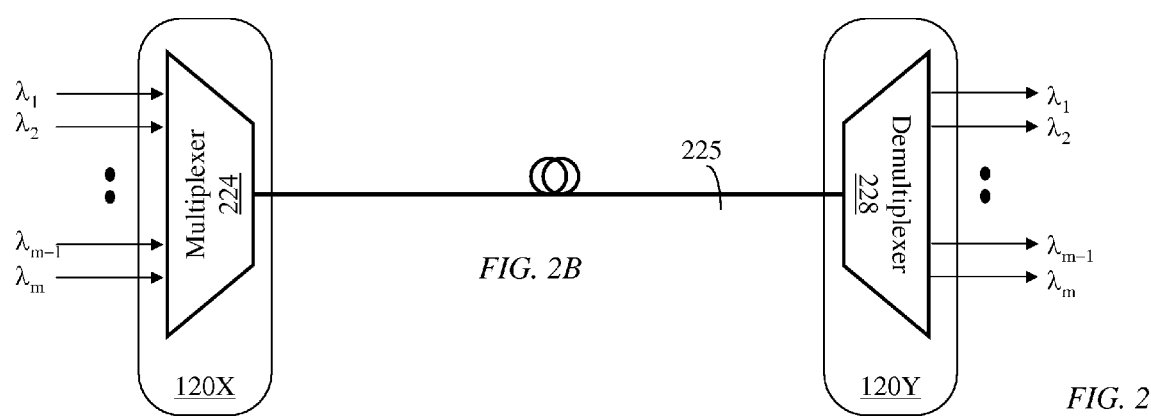
FIG. 2B
FIG. 2

METHOD AND SYSTEM FOR POWER MANAGEMENT IN OPTICAL NETWORKS

CROSS-REFERENCE TO RELATED APPLICATIONS

This application claims priority to provisional application 60/808,975, which was filed on May 30, 2006, and is incorporated herein by reference.

FIELD OF THE INVENTION

The invention relates to optical networks, and in particular, to a method and system for power management in optical networks, where crosstalk due to optical-power scattering is present.

BACKGROUND

In optical networks comprising nodes interconnected by wavelength-division-multiplexed (WDM) fiber links, low frequency tones are often used for providing both power monitoring and identification of optical channels. For example, low-frequency tones each of a frequency between 10 kHz and 1 MHz may be used to modulate the amplitude of individual optical carriers at the edge of the network. To monitor the carrier power in a fiber link, an optical tap may be used to extract a measured sample of the propagating optical signal comprising wavelength-multiplexed carrier signals. The tapped optical signal is processed to detect the individual modulating tones, determine their frequency content, and measure the power levels of individual tones. Tapped-signal processing may be realized using low cost circuitry.

Methods and apparatus for identifying channels in an optical network are described in the following patent applications:

U.S. Pat. No. 7,054,556, titled "Channel identification in communications networks";
U.S. Pat. No. 7,127,165, titled "Method and system for compensating for side effects of cross gain modulation in amplified optical networks";
U.S. Pat. No. 7,139,486, titled "Method and apparatus for optical add/drop multiplexing in optical networks"; and
U.S. Pat. No. 7,142,783 titled, "Method and system for identification of channels in an optical network".

The presence of light-energy scattering in a WDM link results in crosstalk among the carrier signals sharing a WDM link. Accordingly, the measured power level of a specific tone, modulating a specific carrier signal, may reflect contributions of more than one carrier signal and, hence, may not accurately represent the power of the specific carrier signal.

There is a need, therefore, to explore methods for accurate estimation of the power levels of carrier signals in the presence of crosstalk in a WDM fiber link while still relying on processing a low-frequency envelope of a tapped optical signal. Accurate power-level estimation enables control of optical-power level across an optical network.

SUMMARY

The present invention provides methods and apparatus for accurate measurement of individual carrier-power levels in an optical transmission system comprising optical channel-routing nodes interconnected by wavelength-division multiplexed (WDM) fiber links. The optical network in which the method and apparatus of the present invention is applied uses tone-modulation of optical-carrier signals for tracking end-to-end paths. A tone is characterized by a frequency content and power level. The frequency content of a tone identifies a carrier signal and the power level of the tone may be used to monitor the power level of the carrier signal it modulates because both the carrier signal and the modulating tone signal experience the same transmission attenuation and similar scattering gain or loss. The disclosed method and apparatus are devised to circumvent the effect of optical-power scattering, known as Raman scattering, on the accuracy of carrier-power measurements.

In accordance with one aspect, the present invention provides a method for measuring signal power in a link in a communications network, the link transporting a plurality of carrier signals where each carrier signal is modulated by a respective information signal. The method comprises steps of modulating a specific carrier signal with an identifying signal to produce a composite carrier signal where the power of the identifying signal is selected to have a predefined ratio to the power of the specific carrier signal. At a monitoring point along the communications link a portion of the light signal comprising the plurality of carrier signals is extracted and analyzed to detect the identifying signal and to obtain a first measurement of power of the identifying signal. The power of the composite signal is then modified by a first factor, the identifying signal is detected again, and a second measurement of power of the identifying signal is obtained. A first estimate of power of the specific carrier signal is computed as a function of the first measurement, the second measurement, the first factor, and the predefined power ratio.

An estimate of crosstalk-power component of the identifying signal detected at the monitoring point is determined as the first measurement minus the first estimate. An estimate of crosstalk-power component of the specific carrier signal at the monitoring point is determined as the cross-talk power component divided by the predefined power ratio.

The first factor may be selected as $(1-\alpha)$, where $0<\alpha<1$, and the first estimate is determined as (the first measurement−the second measurement)/$(\alpha \times R)$, where R is the predefined power ratio. Alternatively, the first factor is selected as $(1+\alpha)$, where $\alpha>0$, and the first estimate is determined as (the second measurement−the first measurement)/$(\alpha \times R)$.

The method comprises further steps of: modifying the composite carrier signal by a second factor; detecting the identifying signal; obtaining a third measurement of power of the identifying signal; and determining a second estimate of power of the specific carrier signal as a function of the second measurement, the third measurement, the first factor, the second factor, and the predefined power ratio. With a first factor of $(1-\alpha)$, and a second factor of $(1+\alpha)$, where $0<\alpha<1$, the second estimate of power is determined as (the third measurement−the second measurement)/$(2\times\alpha\times R)$, where R is the predefined power ratio. An estimate of crosstalk-power component of the identifying signal detected at the monitoring point is determined as the first measurement minus the second estimate; and an estimate of crosstalk-power component of the specific carrier signal at the monitoring point is determined as the cross-talk power component divided by the predefined power ratio.

The identifying signal may be selected as a sinusoidal signal spectrally distinct from information signals modulating the carrier signals. Alternatively, the identifying signal may comprise time-multiplexed sinusoidal signals which are spectrally distinct from the information signals modulating the carrier signals.

The first measurement, the second measurement, and the third measurement are obtained by electronic means using either analog spectral analysis or analog-to-digital converters and digital spectral analysis. The digital spectral analysis is preferably based on using Fast-Fourier-Transform.

In addition to the specific carrier signal, each other carrier signal may be modulated with a respective identifying signal. The method of measuring signal power applies to each carrier signal individually.

In accordance with another aspect, the present invention provides a method for measuring signal power in a link in an optical network, the link transporting a wavelength-multiplexed signal comprising m>1 carrier signals, indexed as 1 to m, where each carrier signal is modulated by a respective information signal and where crosstalk among the modulated carrier signals is present. The method comprise a step of amplitude-modulating a specific carrier signal of index j, $1 \leq j \leq m$, and power $u_j$ with an identifying signal of power $R \times u_j$, $R<1$, to produce a composite signal prior to transmitting the specific carrier signal. Further steps, implemented at a monitoring point along the link, include: detecting the identifying signal to obtain a detected identifying signal; obtaining an initial measurement of power $\pi_j$ of the detected identifying signal; modifying power of the composite signal by a first factor $(1+\alpha_j)$, where $|\alpha_j|>\check{a}$, and $\alpha_j>-1$, a being a lower bound of the magnitude of $\alpha_j$; obtaining a new measurement $\pi^*_j$ of power of the identifying signal; and determining power of the carrier signal of index j as $W_j=(\pi^*_j-\pi_j)/(\alpha_j \times R)$. The value of $\alpha_j$ has a predetermined upper bound $\hat{a}$.

In accordance with a further aspect, the present invention provides a system for measuring signal power in a link in a communications network, the link transporting m>1 carrier signals modulated by respective information signals, where crosstalk among the carrier signals is present. The system comprises: an amplitude modulator for modulating a carrier signal with an identifying signal to produce a composite signal; a detector for detecting the identifying signal from the total optical signal of the link to obtain a detected identifying signal; a signal analyzer for obtaining a power measurement of the detected identifying signal, and a wavelength-selective gain-control device for modifying power of a selected composite signal by a controllable factor. The system further comprises a controller communicatively coupled to the wavelength-selective gain-control device and to the signal analyzer. The controller sets a first value of the controllable factor; obtains from the signal analyzer a first power measurement of the detected identifying signal corresponding to the first value of the controllable factor; sets a second value of the controllable factor; obtains from the signal analyzer a second power measurement of the detected identifying signal corresponding to the second value of the controllable factor; and determines power of the identifying signal in the composite signal as a function of the first value, the first power measurement, the second value, and the second power measurement. The amplitude modulator comprises a power-level selector for selecting a power level of the identifying signal to have a predetermined ratio to a power level of the carrier signal. The controller determines power of a carrier-signal component of the selected composite signal as the power of the identifying-signal component divided by the predetermined ratio.

The controller preferably sets the first value to equal to 1.0, the second value to equal $(1+\alpha)$, and determines the power p of the identifying-signal component as:

$p=$(the second power measurement−the first power measurement)$/\alpha$, where $\alpha>-1$ and the magnitude of $\alpha$ exceeds a predefined minimum value.

The wavelength-selective gain-control device may be incorporated in a reconfigurable optical add-drop multiplexer, or a wavelength-selective optical switch. The detector may be an analog amplitude detector. The signal analyzer preferably comprises: a signal sampler for obtaining samples of the detected identifying signal; an analog-to-digital converter for converting the samples into digital data; and a processor for performing discrete transform of the digital data.

In accordance with a further aspect, the present invention provides a method for controlling signal power in an optical network comprising a plurality of optical nodes interconnected by a plurality of links, where each link transports a plurality of composite signals, each composite signal being a carrier signal modulated by a distinctive identifying tone, and where each link has at least one monitoring device with a collocated gain-control device. The method comprises steps of cyclically selecting a link according to a predetermined order and sequentially selecting a monitoring device of the link at which the carrier power of each composite signal is estimated. The composite signals carried by the link are selected sequentially. For each composite signal under consideration: a first measurement of power of the identifying tone is obtained; the power of the composite signal is modified according to a specific factor; a second measurement of power is obtained; an estimate of power of the identifying tone is determined using the first measurement, the second measurement, and the specific factor; and a correction factor is determined as a ratio of an objective power level to the estimate of power.

The method further comprises a step of adjusting a power level of the composite signal under consideration at a point in the link preceding the monitoring point according to the correction factor. The predetermined order of processing the links may be based on several criteria, such as a number of end-to-end paths traversing each link in the plurality of links. The composite signals of each link are preferably arranged in a specific order, such as a descending order of wavelength, for sequential processing.

An estimate of power of a carrier signal of a composite signal is determined according to a predefined power ratio of the identifying signal to the carrier signal of the composite signal. The specific factor may be expressed as $(1+\alpha)$, where $-1<\alpha<\hat{a}$, and $|\alpha|>\check{a}$, $\hat{a}$ being a predefined upper bound and a being a predefined lower bound, and the estimate of power of the carrier signal is determined as $(\pi^*-\pi)/(\alpha \times R)$, where $\pi^*$ is the second measurement, $\pi$ is the first measurement, and R is the predefined power ratio.

BRIEF DESCRIPTION OF THE DRAWINGS

Embodiments of the present invention will be further described with reference to the accompanying exemplary drawings, in which:

FIG. 2A illustrates a set of links connecting two optical nodes where each link has only one optical carrier, for use in illustrating an embodiment of the present invention;

FIG. 2B illustrates a WDM link connecting two optical nodes in the network of FIG. 1 where crosstalk due to scattering is significant;

DETAILED DESCRIPTION OF THE PREFERRED EMBODIMENTS

Terminology

Figure 1:
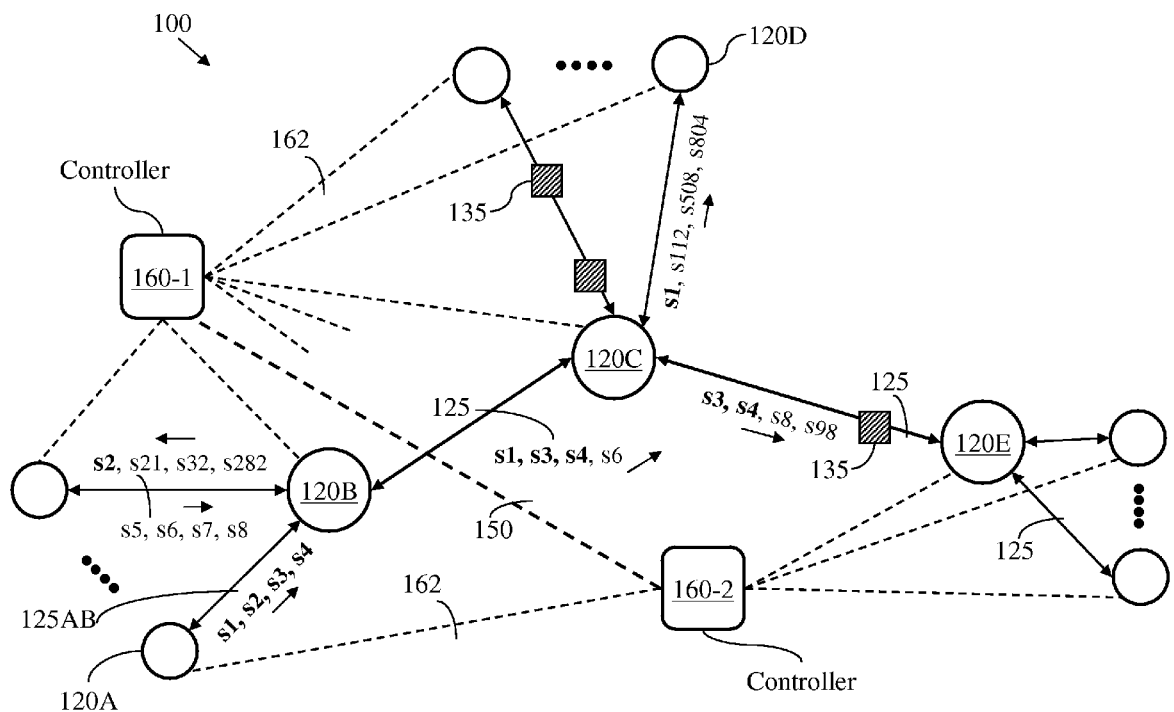
FIG. 1 illustrates a network comprising optical nodes interconnected by wavelength-division-multiplexed (WDM) links, devices for modulating optical carriers with distinctive identifying signals, and devices for controlling the power levels of the modulated optical carriers in accordance with an embodiment of the present invention.

Optical switching node: An optical switching node is a device for receiving optical signals from at least two input channels and directing each received optical signal to one of at least two output channels. The optical switching node considered herein may take the form of a space switch or a wavelength-channel add-drop multiplexer. The input channels may comprise channels arriving from another switching node and sharing an input wavelength-division multiplexed (WDM) link as well as channels from local data sources. The output channels may comprise channels directed to another switching node and sharing an output WDM link as well as output channels leading to local data sinks.

Optical transmission node: An optical transmission node is a passive device used for processing signals received from input channels and placing the processed signals to output channels having one-to-one correspondence to the input channels. The signal-processing function may include overall amplification or wavelength-selective gain control.

Wavelength-tracking unit: A wavelength-tracking unit used in the network of the present invention has a primary function of ensuring proper routing of each carried optical signal. The unit may be further provided with a capability to measure optical power.

Wavelength-selective gain-control device: The wavelength-selective gain-control device used in the network of the present invention is provided with a capability to apply a predetermined gain (or attenuation) to a selected carrier signal or to any subset of carrier signals.

Carrier signal: The term carrier signal is used to indicate an optical signal of a single frequency (single wavelength).

Information signal: An information signal refers to a "payload" signal, modulating a carrier signal. A typical information signal is a digital signal of 2.5 or 10 Gigabits per second.

Identifying signal: An identifying signal is a specific signal used to modulate a carrier signal in order to identify the carrier signal as it propagates through switching node to ensure proper routing.

Signature: An identifying signal is often referenced as a "signature" to emphasize its role in tracking (modulated) carrier signals.

Tone: An identifying signal is conveniently devised as a low-frequency sinusoidal signal called "tone". The term is also used herein to refer to an identifying signal comprising multiple low-frequency sinusoidal signals which may be time-interleaved.

Tone band: A tone comprising multiple-sinusoidal signals, however organized, may occupy a (low) frequency band which may be contiguous or spread.

Composite carrier signal: A carrier signal modulated by both an identifying signal and an information signal is called a "composite carrier signal", or "a composite signal". Modulation by the identifying signal should not interfere with detection of the information signal.

Wavelength channel: A composite carrier signal occupies an optical-frequency band (a wavelength band) within the bandwidth of a fiber link. The occupied band is loosely called a "wavelength channel" or a "channel".

Link: A link is a transmission medium connecting one switching node to another switching node. A WDM link may comprise several wavelength channels.

Span: A link may comprise a concatenation of fiber-optic spans joined at passive transmission nodes.

A path: A path comprises a wavelength channel in each of a series of links connecting a first (source) switching node to a second (destination) switching node.

Optical Network with Channel Monitoring Capability

FIG. 1 illustrates a network 100 in which the present invention may be deployed. The network 100 comprises a plurality of optical switching nodes 120 interconnected by optical wavelength-division-multiplexed (WDM) fiber links 125. A fiber link 125 exceeding a predetermined length may traverse passive transmission nodes for signal enhancement. The passive transmission nodes divide the link into a number of spans as will be illustrated in FIG. 3. A fiber link connecting a first switching node to a second switching node may comprise multiple spans where a first span connects the first switching node to a first passive transmission node. If the fiber link traverses only one passive transmission node, a second span connects the first passive transmission node to the second switching node. Otherwise, the second span connects the first passive transmission node to a second passive transmission node, and a third span connects the second passive transmission node to either the second switching node or to a third passive transmission node, if any, and so on.

An optical switching node 120 may be an edge node directly connected to signal sources and sinks or a core optical node for routing optical signals among edge nodes. The network 100 may comprise several tracking units 135 to ensure routing sanity. A tracking unit 135 may also be provided with power-measurement devices to ensure appropriate signal power and wavelength-selective gain-control devices to provide power control where needed. At least one tracking unit 135 may be placed along a path from one switching node 120 to another. A global network controller 160, which may be geographically distributed in the form of well-coordinated control nodes, is communicatively coupled to each of the tracking units 135 either directly through links 162 or through some external network. FIG. 1 illustrates two communicatively coupled network controllers 160-1 and 160-2.

A path from an optical switching node 120 to another may traverse several links 125 where the path includes one wavelength channel in each link. An optical node 120 may perform wavelength channel switching, including simple add-drop multiplexing, and may monitor and adjust optical-signal levels.

The channels of each link 125 are individually and uniquely modulated by identifying signals, also called tones, dither tones, or signatures. The identifying signals of wavelength channels within a link are distinct. An identifying signal associated with a wavelength channel may carry information identifying the channel for tracking purposes. An identifying signal may also indicate signal intensity at different points along a WDM link and may be devised to carry other control information. In a first channel-identification scheme, as illustrated in FIG. 1, each end-to-end path in the network 100 is given a distinct signature and, consequently, a specific signature may appear in two or more links traversed by an end-to-end path. The signatures are indicated as $s_1$, $s_2, \ldots, s_{804}$. The required number of distinct signatures is then at least equal to the number of end-to-end paths. In a second channel-identification scheme, a signature may not appear in more than one link. The number of required signatures is then substantially higher than that of the first scheme. Several techniques may be employed to increase the number of available signatures using combinations of identifiers. A simple identifier is a low-frequency tone having a frequency within a frequency band or occupying non-contiguous frequency bands carefully selected to meet several criteria.

Figure 3:
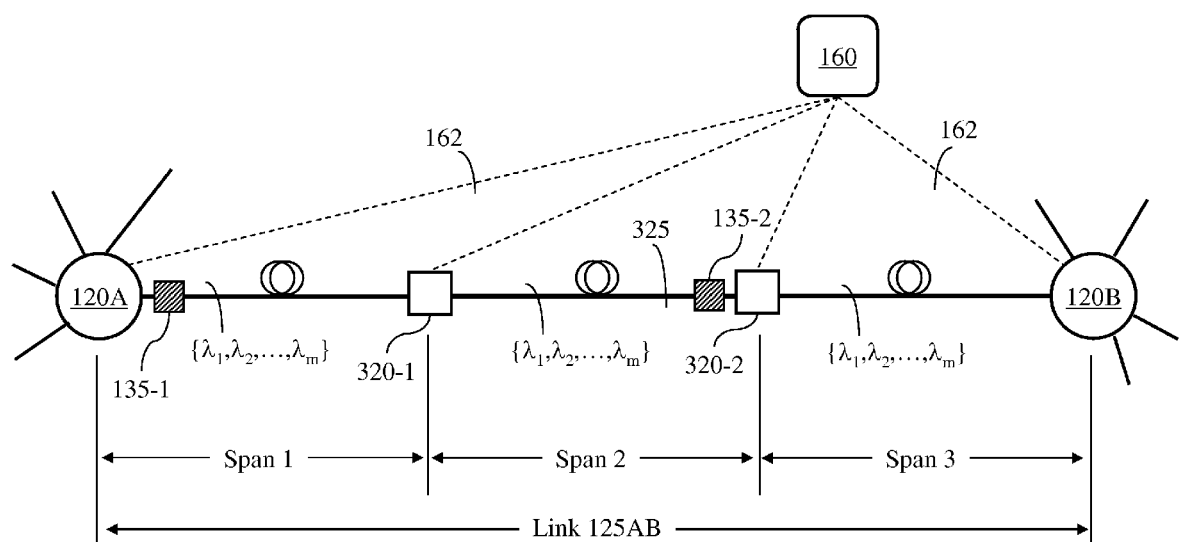
FIG. 3 illustrates a WDM link in the network of FIG. 1 connecting two optical switching nodes and traversing two passive transmission nodes.

In both the first and second channel-identification schemes, the global network control node 160 determines and assigns the individual signatures and distributes relevant information to optical switching nodes 120 of network 100 as well as to any intervening passive optical transmission nodes as illustrated in FIG. 3. In the second channel-identification scheme, the global network controller 160 would have the extra burden of interrelating signatures of channels constituting an end-to-end path.

A local controller operating in the electronic domain (not illustrated) is associated with each optical switching node and each optical transmission node that participate in the power-monitoring system. A network controller 160 may communicate directly with selected local controllers.

In FIG. 1, a path from node 120A to node 120D traverses nodes 120B and 120C. The path is identified by a signature $s_1$ which appears in all links 125 connecting optical node 120A to node 120D. A path from node 120A to node 120E is identified by a signature $s_3$ which appears in the three links connecting node 120A to node 120E.

Regardless of the scheme used for channel-identification, the channels of each link 125 are monitored to ensure proper routing and proper signal levels.

FIG. 2A illustrates m>1 wavelength channels 215 connecting a first optical node 120X to a second optical node 120Y in a hypothetical arrangement where each of the m channels exclusively occupies a fiber link 215 connecting a port 214 in node 120X to a port 218 in node 120Y. Thus, m links are needed to connect the first node 120X to the second node 120Y. The m channels are centered at wavelengths $\lambda_1$, $\lambda_2, \ldots, \lambda_m$. A channel $C_j$, $1 \leq j \leq m$, carries $u_1$ watts at the sending end (the first node 120X). Channel C delivers $W_j$ watts to the second node 120Y. With $u_j > 0$, the ratio $W_j/u_j$ is determined by the intrinsic attenuation of link j and any possible amplification along link j. The link attenuation (or amplification) is considered time-invariant. There is no interaction among the m channels and, hence, power measurements at the second node may be used directly to adjust the power level at the input of any of the m links.

In FIG. 2B, spectral multiplexer 224 multiplexes the m channels onto a common link 225. If the attenuation and/or gain of each channel $C_j$, $1 \leq j \leq m$, in the common link 225 is the same as that of link j in the arrangement of FIG. 2A, and if the m wavelengths are spaced to render crosstalk negligible (implying a small number m of channels), then the power carried by channel $C_j$ at the second node would be substantially equal to the power $W_j$ delivered by link j in the arrangement of FIG. 2A. When crosstalk is present, the power—denoted $W^*_j$—carried by channel $C_j$ at the second node 120 differs from $W_j$ by an amount determined by the crosstalk power received from channels of wavelengths shorter than $\lambda_j$, if any, and crosstalk power transferred to channels of wavelengths greater than $\lambda_j$, if any. A spectral demultiplexer 228 may be used at node 120Y to separate the multiplexed carrier signals and a power-measuring device deployed at the second node 120Y would measure the values $W^*_j$, $1 \leq j \leq m$. The contribution of crosstalk to the carrier power $W^*_j$ of channel $C_j$ at the second node 120Y is not directly known.

A preferred method of measurement uses the identifying signals (also called tones or signatures) described above with reference to FIG. 1 to monitor power levels in any span in any link 125.

FIG. 3 illustrates a WDM link 125AB in the network of FIG. 1 connecting two optical switching nodes 120A and 120B and traversing two passive transmission nodes 320-1 and 320-2 dividing the link into three spans: a first span (span-1) connecting optical switching node 120A to passive transmission node 320-1; a second span (span-2) connecting the first transmission node 320-1 to the second transmission node 320-2; and the third span (span-3) connecting the second transmission node 320-2 to the second switching node 120B. Optical-power control may be applied separately for each of the three spans, to a concatenation of any two spans, or to the entire WDM link 125AB. Wavelength tracking units 135 may be provided at all or at a subset of nodes 120A, 320-1, 320-2, and 120B. A tracking unit 135 ensures proper routing of wavelength channels by detecting identifying signals of composite carrier signals propagating through a link and comparing with a reference list of expected identifying signals. A tracking unit may also include a power detector to determine signal power and a wavelength-selective gain-control device to adjust signal power levels. Signal power levels are adjusted either "permanently" for operational purposes or temporarily for executing the methods of the present invention for accurate power monitoring in the presence of crosstalk as will be detailed below. For example, the channel-routing function in network 100 assigns wavelength channels $C_1, C_2, \ldots, C_m$, of carrier wavelengths $\lambda_1, \lambda_2, \ldots, \lambda_m$, to link 125AB. The m wavelength channels are expected to be present and at appropriate power levels in each span in link 125AB because each of transmission nodes 320-1 and 320-B is a passive node which may perform signal processing but does not switch a signal to a different path. A tracking unit 135-1 provided at a designated output port of switching node 120A verifies that the m channels have been switched properly in switching node 120A and a tracking unit 135-2 provided at transmission node 320-2 verifies that the m channels have maintained appropriate power levels through span-1 and span-2.

Figure 4:
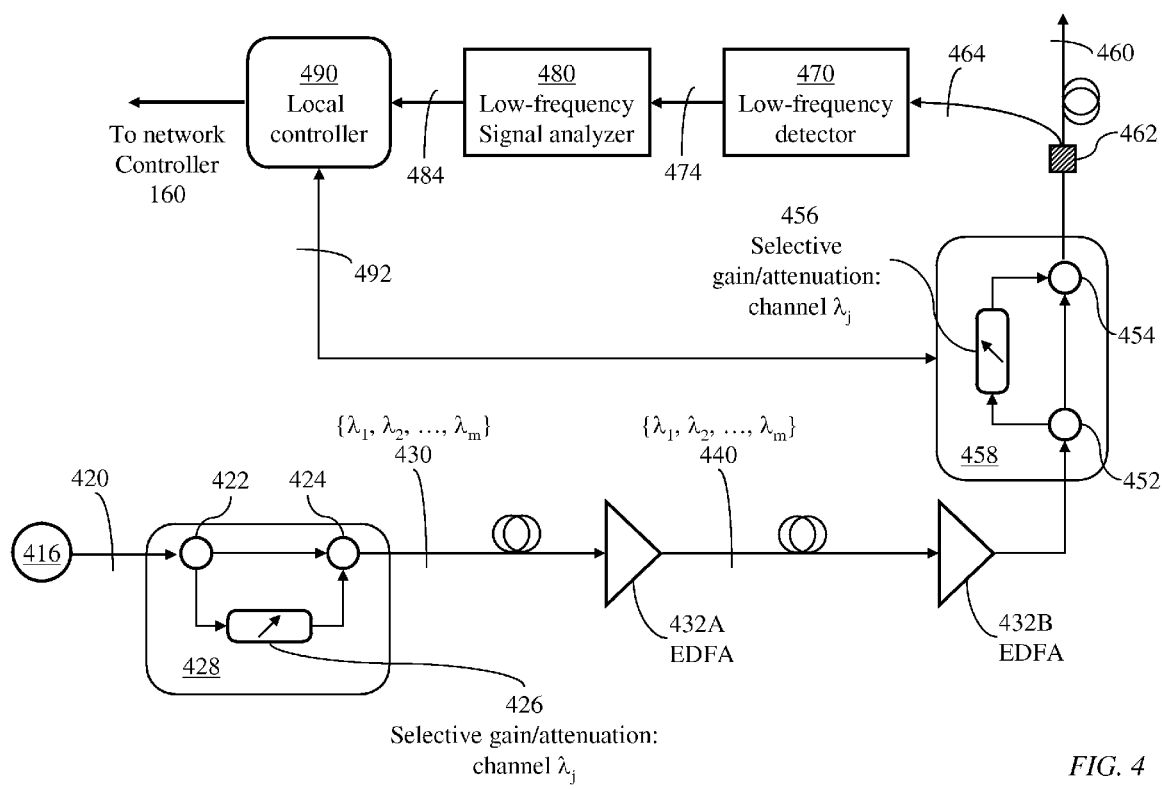
FIG. 4 illustrates a segment of the link in network 100 provided with a wavelength selective gain-control device coupled to a local processing unit for determining carrier power in accordance with an embodiment of the present invention.

FIG. 4 illustrates a segment of a link 125 in network 100 traversing fiber spans 430, 440, and 450 and including two optical amplifiers 432A and 432B. A first wavelength-selective gain-control device 428 receives a WDM optical signal from a fiber link 420 and may adjust the power level of any carrier signal if required. Device 428 is illustrated schematically to include a component 422 for isolating a specific (modulated) optical carrier signal, a component 426 for applying a desired gain or attenuation to the specific optical signal, and a combiner 424. An optical-signal tapping device 462 is positioned following the second span 440. A second wavelength-selective gain-control device 458 is provided in the vicinity of, but preceding, the tapping device 462. Components 452, 456, and 454 are similar to components 422, 426, and 424, respectively. The device 458 is controlled by a local controller 490 which selects a value of gain (or attenuation) to be applied to a selected wavelength channel. Local controller 490 has a control path 492 to the second wavelength-selective gain-control device 458. Local controller 490 communicates with the first wavelength-selective gain-control device 428 through a network controller 160.

The received signal from incoming fiber link 420 comprises a number of carrier signals each carrier signal modulated with an identifying signal in addition to an information signal. Modulating a carrier signal by an identifying signal may take place at a node, preceding fiber link 420, presented in FIG. 4 as node 416. Node 416 may not be directly connected to fiber link 420. Link 420 may, however, carry unmodulated carrier signals in addition to the modulated carrier signals. Device 428 may be incorporated in an optical switching node 120, which may be a space switch or an add-drop multiplexer. The output of device 428 comprises m modulated carrier signals propagating through fiber-optic spans 430, 440 and 460 towards some destination. The monitoring device 462 taps a portion of the optical signal and the tapped signal is supplied via a (short) link 464 to a low-frequency detector 470. The detected low-frequency signal, which comprises tone signals of individual carrier signals and other low-frequency components resulting from cross modulation, is supplied to a signal analyzer 480 through an internal path 474.

The ratio θ of tapped-signal power to the propagating signal power is precisely determined. A typical value of the ratio θ is 0.05. It is important to note that any tone-power measurement obtained by any means, analog or digital, is preferably automatically adjusted according to the ratio θ to yield the actual tone power of the corresponding composite signal propagating through the monitored link. Alternatively, the ratio θ may be incorporated in a ratio of tone-signal power in a tapped-signal to actual carrier power.

A low-frequency signal analyzer 480 may measure the power of any of the tone signals. The measurements are supplied to a local controller 490 through internal path 484, and the local controller 490 communicates the measurements, or a power correction factor based on the measurements, to a network controller 160. A power correction factor is determined by comparing a power measurement with a predetermined objective power level. Controller 160 has a control path (not illustrated) to the first wavelength-selective gain-control device 428, as well as control paths to other monitoring devices as illustrated in FIG. 1. The signal analyzer 480 may be an analog instrument or a digital instrument employing discrete spectral-analysis techniques. If an analog instrument is used, its output is converted to digital format which is directed to the local controller 490. If the instrument is digital, analog-digital conversion precedes the measurements. Any of available software programs for evaluating the discrete Fourier transform of a sampled signal may be used. A typical program uses a "Fast-Fourier-Transform" algorithm which lends itself easily to digital realization. The derivation of the discrete Fourier transform may be performed in either the signal analyzer 480 or the local controller 490. The local controller 490 further implements the methods of the invention to accurately estimate individual carrier power levels at the monitoring point and transmit the results to a respective network controller which instructs the first wavelength-selective gain-control device 428 to adjust carrier-signal power accordingly.

Crosstalk Spectrum in a Tone-modulated WDM Link

It is well known that light scattering within a WDM fiber link results in crosstalk where energy is transferred from a carrier signal to another carrier signal of longer wavelength. This property is known as the Raman scattering phenomenon. The transfer of energy from a first carrier signal amplitude modulated by a first tone to a second carrier signal amplitude modulated by a second tone results in attenuation of the first carrier signal together with its modulating first tone and amplification of the second carrier signal together with its modulating second tone. In addition, the fluctuating amplitudes of the two carrier signals result in the first carrier signal being further modulated by the second tone and the second carrier signal being further modulated by the first tone. With a large number of carrier signals sharing a WDM link, the spectrum of the envelope of each carrier signal would comprise the frequencies of the tones of all carrier signals in addition to their cross-modulation products.

Figure 5:
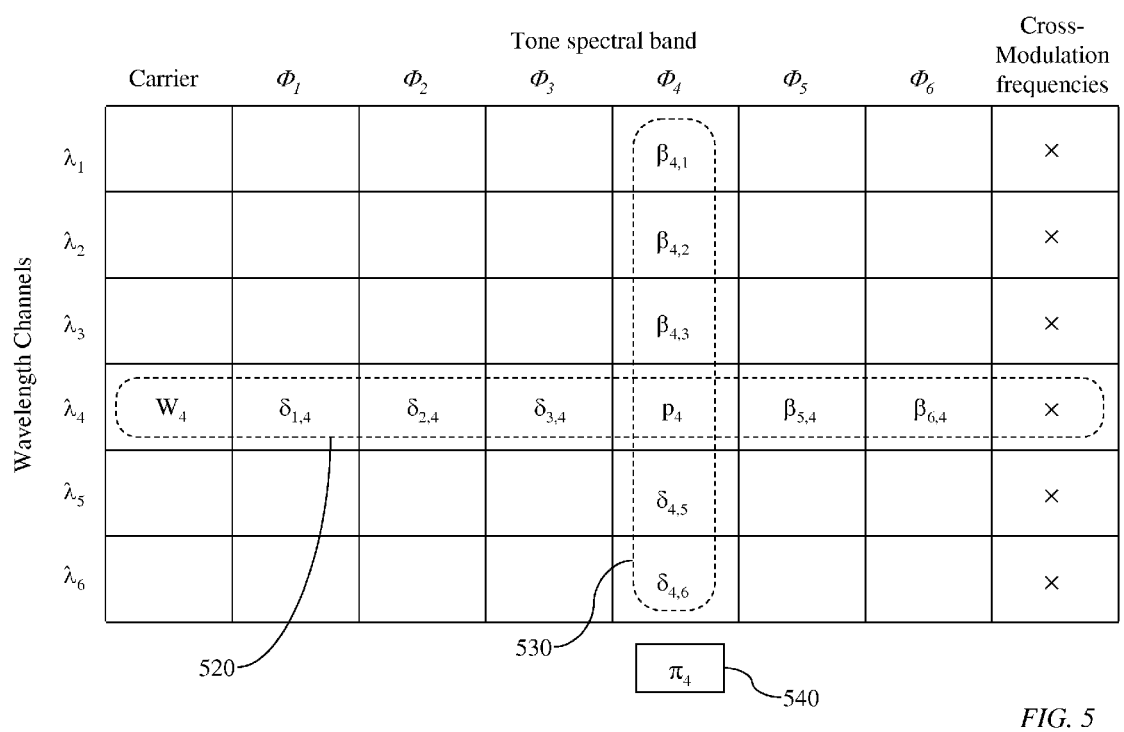
FIG. 5 illustrates crosstalk power components within a WDM link transporting tone-modulated composite carrier signals for use with an embodiment of the present invention.

FIG. 5 illustrates crosstalk power components within a WDM link transporting tone-modulated composite carrier signals.

The crosstalk among the tone-modulated carrier signals produces composite carrier signals each having an envelope containing the tone-frequencies of all other carriers in addition to the pair-wise sums and differences of the tone frequencies, as illustrated in FIG. 5 which illustrates crosstalk products for a WDM link having six wavelength carriers of wavelengths $\lambda_1, \lambda_2, \lambda_3, \lambda_4, \lambda_5, \lambda_6$, where $\lambda_1 > \lambda_2 > \lambda_3 > \lambda_4 > \lambda_5 > \lambda_6$. Each wavelength carrier is modulated with a respective information signal and further amplitude-modulated by a distinctive identifying tone to produce a composite carrier signal. For brevity, each composite carrier signal is said to occupy a "wavelength channel", or simply a "channel", where each channel corresponds to a wavelength band (an optical-frequency band) centered on a corresponding wavelength (a corresponding optical frequency). A channel centered on wavelength $\lambda_j$ is referenced as $C_j$. For each composite carrier signal, the tone power bears a predetermined ratio to the carrier power. The tone signals for the six wavelength channels $\lambda_1$ to $\lambda_6$ have tone-frequency bands $\Phi_1$, $\Phi_2$, $\Phi_3$, $\Phi_4$, $\Phi_5$, and $\Phi_6$, respectively. Other resulting low frequencies are grouped in one column with entries marked 'x'. A frequency band $\Phi_j$, $1 \leq j \leq 6$, may contain a single discrete frequency or a mix of multiple discrete frequencies, and the frequency band is selected to meet certain criteria; for example a frequency band should not overlap the frequency spectrum of information signals modulating the carrier signal. The discrete frequencies of different tone-frequency bands may, however, interleave.

Consider, for example, a composite carrier signal of wavelength $\lambda_4$ where, at the sending end, the carrier power is $W^*_4$ and the tone power is $p^*_4$. Without loss of generality, the WDM link may be considered to be ideal, offering unity gain (zero decibels) for each of the composite-signals. This simplification will be reconsidered below. With unity gain, the power received at the monitoring point related to wavelength channel $C_4$ assumes a value of $W_4$, where the difference $(W^*_4 - W_4)$ may be positive, if, due to scattering, channel $C_4$ receives more power from channels $C_5$ and $C_6$ than it imparts to channels $C_3$, $C_2$, and $C_1$, or negative otherwise. The tone power of the composite carrier signal received at the monitoring point would be $p_4$ where the difference $(p^*_4 - p_4)$ may be positive or negative. As illustrated in FIG. 5, wavelength channel $C_4$ imparts to wavelength channels $C_3$, $C_2$, and $C_1$ tone power, in frequency band $\Phi_4$, of values $\beta_{4,3}$, $\beta_{4,2}$, and $\beta_{4,1}$, respectively. Likewise, channel $C_5$ imparts to wavelength channel $C_4$ tone power, in frequency band $\Phi_5$, of value $\beta_{5,4}$, and channel $C_6$ imparts to wavelength channel $C_4$ tone power, in frequency band $\Phi_6$, of value $\beta_{6,4}$.

Because the composite carrier signals of channels $C_1$, $C_2$, and $C_3$ are tone-modulated with frequency bands $\Phi_1$, $\Phi_2$, $\Phi_3$, the transfer of power from channel $C_4$ to channels $C_1$, $C_2$, and $C_3$ results in amplitude modulation of the carrier signals of channel $C_4$, with tones in frequency bands $\Phi_1$, $\Phi_2$, $\Phi_3$, and the power of channel $C_4$ contains corresponding tone power of values $\delta_{1,4}$, $\delta_{2,4}$, and $\delta_{3,4}$, respectively. Likewise, because the composite carrier signal of channels $C_4$ is tone-modulated with frequency band $\Phi_4$, the transfer of power, from channels $C_5$ and $C_6$ to channel $C_4$, results in amplitude modulation of the carrier signals of channels $C_5$, and $C_6$ with tones in frequency band $\Phi_4$, with corresponding tone power of values $\delta_{4,5}$, $\delta_{4,6}$, respectively.

A measurement of tone power in frequency band $\Phi_4$ would then yield a power $\pi_4$ where $\pi_4 = (p_4 + q_4)$, $q_4$ being the combined crosstalk in frequency band $\Phi_4$ within channels $C_1$, $C_2$, $C_3$, $C_5$, and $C_6$ (excluding channel $C_4$), i.e., $$q_4 = \beta_{4,3} + \beta_{4,2} + \beta_{4,1} + \delta_{4,5} + \delta_{4,6}.$$

The tone power component $p_4$ within channel $C_4$ is indicative of the carrier power $W_4$ received at the monitoring point.

In FIG. 5, the power components identified in row 520 constitute the total power within the wavelength-band (optical-frequency band) occupied by channel $C_4$. The power components identified in column 530 constitute the total power $\pi_4$ (reference 540) in low-frequency tone band $\Phi_4$ as seen by the low-frequency detector 470, and after accounting for instrumentation parameters, such as the proportion of optical-signal power tapped by optical-signal tapping device 462.

In order to isolate the crosstalk power $q_j$, in accordance with an embodiment of the present invention, a temporary gain is applied to the signal of channel $C_j$ and the corresponding change in the power of channel $C_j$ is measured. It is essential, however, that the temporary gain be discriminatory, being applied to either of the components $p_j$ or $q_j$, but not both. In a preferred embodiment according to the present invention, the total power of the composite carrier signal of channel $C_4$ is multiplied by a predetermined factor $(1+\alpha)$ where $-1 < \alpha < â$, and $|\alpha| < ă$. The upper bound $â$ is constrained by crosstalk tolerance and the lower bound $ă$ is based on the sensitivity of detection and measurement instruments.

The power $\pi_j$, $(\pi_j = p_j + q_j)$, of channel $C_j$ is measured at a monitoring point (the second optical node) under normal load condition, or generally under a current load condition. When a discriminating gain (attenuation) $(1+\alpha)$ is applied to only $p_j$, the measured power of channel $C_j$ at the second node changes to $\pi^*_j = (1+\alpha)p_j + q_j$.

Figure 6:
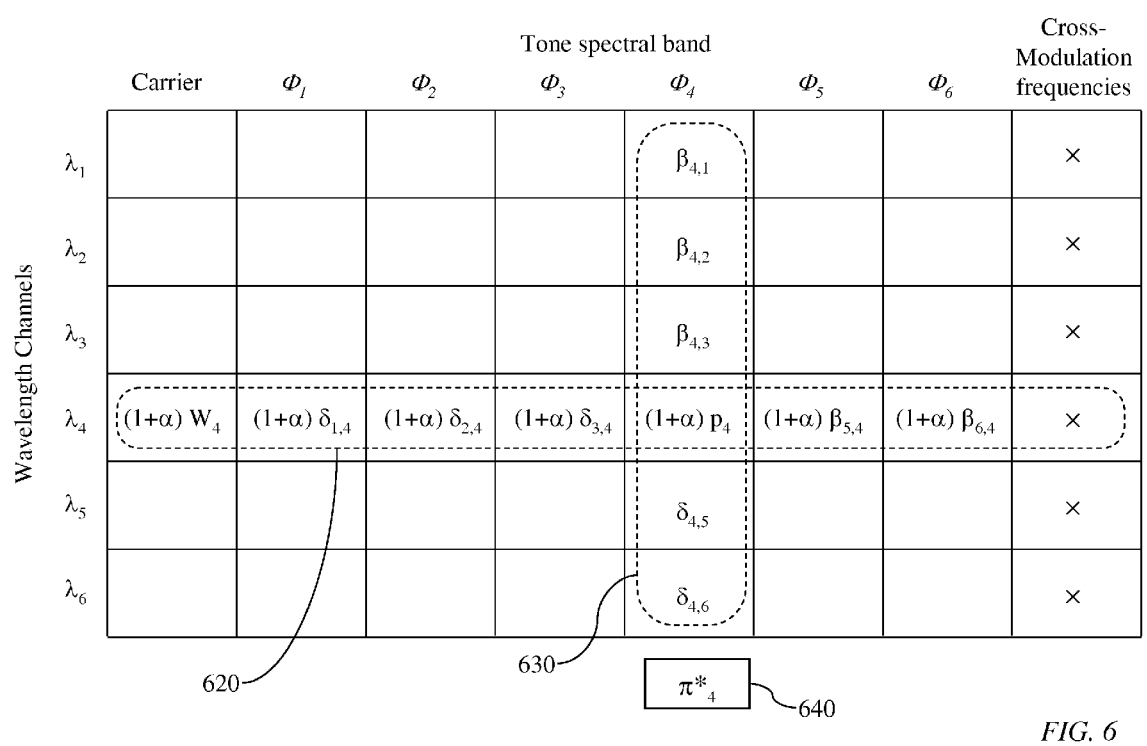
FIG. 6 illustrates application of selective gain to a composite carrier signal to determine carrier power at a monitoring point along a WDM link in accordance with an embodiment of the present invention.

FIG. 6 illustrates application of selective gain, in accordance with an embodiment of the present invention, to a composite carrier signal to determine carrier power at a monitoring point along a WDM link. As illustrated in FIG. 6, a measurement of tone power in frequency band $\Phi_4$ after the induced temporary power change of channel $C_4$ would yield a power $\pi^*_4$ where $\pi^*_4 = (1+\alpha) p_4 + q_4$, where $q_4$ is the combined crosstalk within frequency band $\Phi_4$ in channels $C_1$, $C_2$, $C_3$, $C_5$, and $C_6$, excluding channel $C_4$, as determined above.

In FIG. 6, the power components identified in row 620 constitute the total power within the wavelength-band (optical-frequency band) occupied by channel $C_4$ after introducing the temporary gain $(1+\alpha)$. Each power component in row 620 has a value $(1+\alpha)$ times its counterpart in row 520 of FIG. 5. The power components identified in column 630 constitute the total power $\pi^*_4$ (reference 640) in low-frequency tone band $\Phi_4$ with only the component $p_4$ being modified by the factor $(1+\alpha)$.

Estimating Carrier Power at Monitoring Point

The tone power $p_j$ recovered at the monitoring point is determined as $p_j = (\pi^*_j - \pi_j)/\alpha$. The power of the carrier-signal propagating in span 460 (FIG. 4) at the monitoring point is then determined as $W_j = p_j/R_j$, $R_j$ being the ratio of identifying-signal power (tone power) to the power of the carrier-signal in a composite carrier signal occupying wavelength channel $C_j$. This ratio is set at a sending end and remains unchanged as the composite carrier signal gains or loses power due to intrinsic link attenuation and scattering.

The ratio $\eta_j = (\pi^*_j/\pi_j)$ may be used to determine a ratio $\rho = (q_j/p_j)$ as:

$$\rho = (q_j/p_j) = (1+\alpha - \eta_j)/(\eta_j - 1),$$

and the tone power $p_j$ in band $\Phi_j$ within channel $C_j$ is determined as:

$$p_j = \pi_j/(1+\rho).$$

Effect of Channel Attenuation

In the above description, the WDM link is considered to offer unity gain to each composite carrier signal. In reality, the gain is determined by the combined effect of intrinsic attenuation, which may be wavelength dependent, and optical-amplifier gain. The estimation of carrier-signal power is determined by applying wavelength-selective gain (or attenuation) at the monitoring point and, hence, preceding gain or attenuation is irrelevant.

Crosstalk Contribution of Passive Optical Nodes

Figure 7:
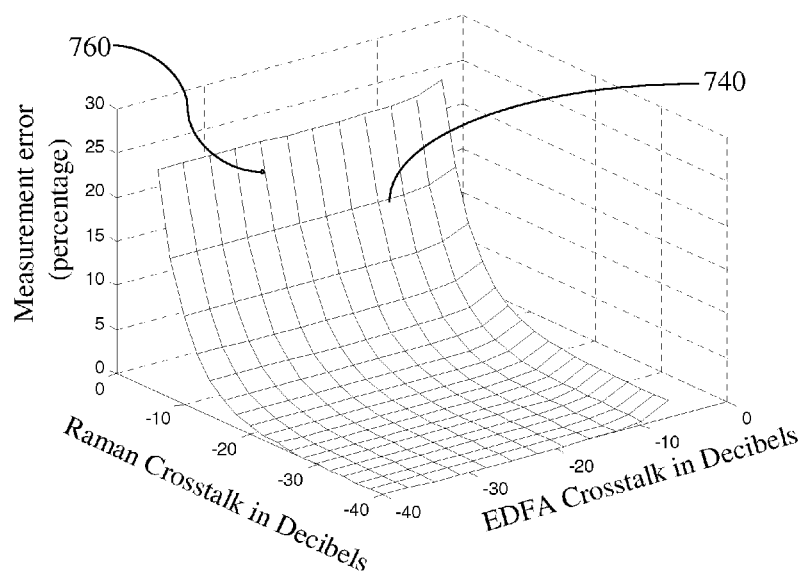
FIG. 7 illustrates the contribution of optical-amplifier crosstalk to the overall crosstalk in a WDM link in which crosstalk due to optical-power scattering is present.
Figure 7:
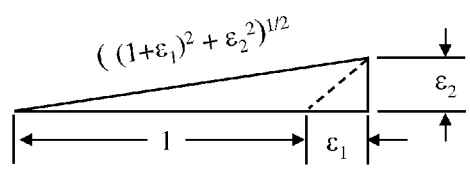
Figure 7:
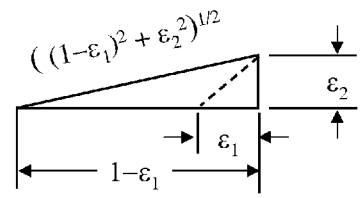

FIG. 7 illustrates the combined effect of crosstalk caused by optical-power scattering and crosstalk occurring within optical amplifiers of the passive optical nodes 320 (FIG. 3). An optical signal propagating in a link having intermediate optical amplifiers, such as Erbium-Doped Fiber Amplifiers (EDFA), suffers from both scattering-induced crosstalk (such as the Raman Stimulation crosstalk) and internal crosstalk within each amplifier. Thus, a detected tone signal at a monitoring point would be affected by the two crosstalk types. It is noted, however, that the power gain or loss of a tone signal is predominantly caused by the scattering crosstalk. Consider a tone of a single (low) frequency having an amplitude (intensity) normalized to unity. Scattering crosstalk may increase (or decrease) the amplitude of the tone with a relative (normalized) increment (or decrement) of $\epsilon_1$ to result in a corresponding power change proportional to $(1\pm\epsilon_1)^2$. The crosstalk (of relative magnitude $\epsilon_2$) generated within an EDFA is orthogonal to the scattering crosstalk as illustrated in FIG. 7. The vector diagrams of FIG. 7 illustrate intensity level of a tone signal in the presence of the two types of crosstalk. With an orthogonal relative amplitude increment of $\epsilon_2$, ($|\epsilon_1|\ll 1$ and $|\epsilon_2|\ll 1$), the total power is proportional to $((1\pm\epsilon_1)^2+\epsilon_2^2)$ as illustrated in FIG. 7, with an insignificant relative power change due to EDFA crosstalk of approximately $\epsilon_2^2$. The relative power change due to scattering crosstalk is approximately $(\pm 2\times\epsilon_1)$.

The contribution of scattering crosstalk and EDFA crosstalk is illustrated in FIG. 7 where tone-measurement error is plotted as a function of Raman crosstalk levels and EDFA crosstalk levels. It is seen that a contour 740 indicates minor measurement change as EDFA crosstalk varies from −10 decibels to −40 decibels. A contour 760 indicates a significant increase in measurement error as the Raman crosstalk increases from −40 decibels to −10 decibels.

The disparity of crosstalk contributions would be of the same order when a tone comprises multiple interleaved sinusoidal signals or other distinctive signals instead of the single sinusoidal wave discussed above.

Determining Carrier Power from Tone-power Measurements

Figure 8:
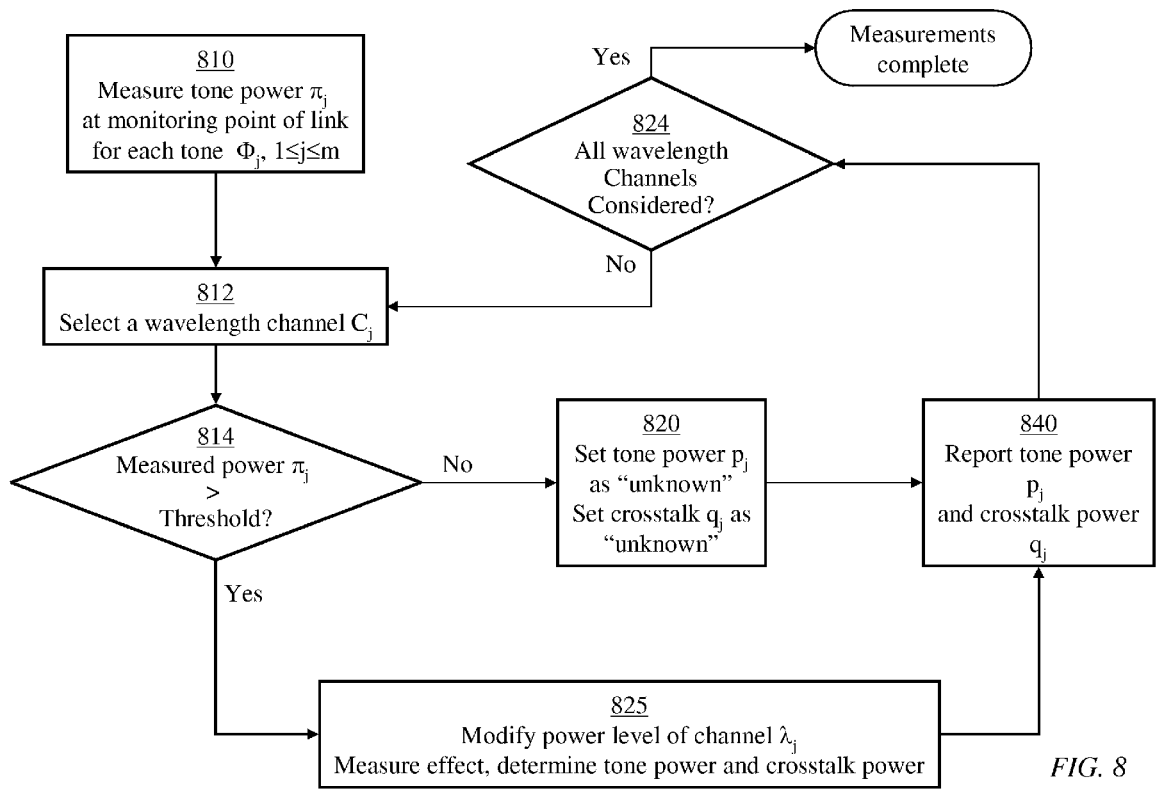
FIG. 8 is a flow chart illustrating a method of measuring optical power of individual optical carriers in the presence of crosstalk in accordance with an embodiment of the present invention.

FIG. 8 illustrates the method, according to the present invention, of determining carrier power, at a monitoring point along a WDM link, of a selected composite carrier signal from among m composite carrier signals sharing a WDM link. The method is preferably implemented by local controller 490 (FIG. 4). However, variations of the procedure of FIG. 8 may divide the computational effort between local controller 490 and a respective network controller 160.

In step 810, tone power $\pi_j$ of each channel $C_j$, $1\leq j\leq m$, is measured. Estimation of the individual carrier power for the m channels may be performed in any selected order. In step 812, a channel $C_j$ is selected and in step 814 the carrier power $\pi_j$ of channel $C_j$, as determined in step 810, is compared with a predetermined threshold. If the tone power $\pi_j$ is found to be below the threshold, the tone power and carrier power of channel $C_j$ are considered inadequate for further processing. In step 820, an indication of an indefinite measurement is formed and the processing is directed to step 840. If the tone power $\pi_j$ exceeds the threshold, step 825 is activated to execute the process of the selective power modification of the present invention and estimation of power in channel $C_j$. The result of step 825 is directed to step 840 and local controller 490 reports the computed tone power, carrier power, and crosstalk power to a respective network controller 160. Step 840 directs the power-estimation process to step 824 which determines whether to select a subsequent wavelength channel $C_j$ (if any) to process a corresponding composite-carrier signal, or to indicate that the process is complete.

Figure 9:
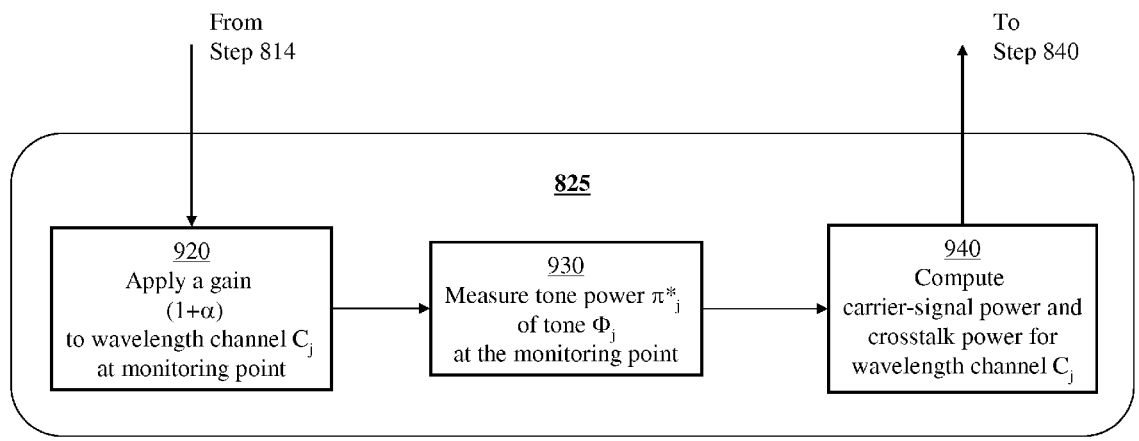
FIG. 9 details a step, in the method of FIG. 8, of measuring response to selective optical-power perturbation and determining carrier power and crosstalk power.

FIG. 9 details a first implementation of step 825 of FIG. 8. In step 920, a temporary power gain $(1+\alpha)$ is applied to channel $C_j$. The method of application of the gain depends on the structure of the detection and monitoring devices used at the monitoring point. The value of $\alpha$ is selected to be below a predetermined upper bound to limit the impact on other wavelength channels. A negative value of $\alpha$, indicating attenuation, may be used, but should not be close to unity, otherwise subsequent measurements related to channel $C_j$ would be unreliable. The magnitude of $\alpha$, regardless whether $\alpha$ is positive or negative, should be above a certain lower bound ă in order to produce a measurable effect. The value of ă depends to a large extent on the sensitivity of the measuring devices.

In step 930, the tone power $\pi^*_j$ in (low) frequency band $\Phi_j$ is measured and the measurement is used in step 940 to compute the power of both the tone and the carrier signals of the composite carrier signal of channel $C_j$.

Figure 10:
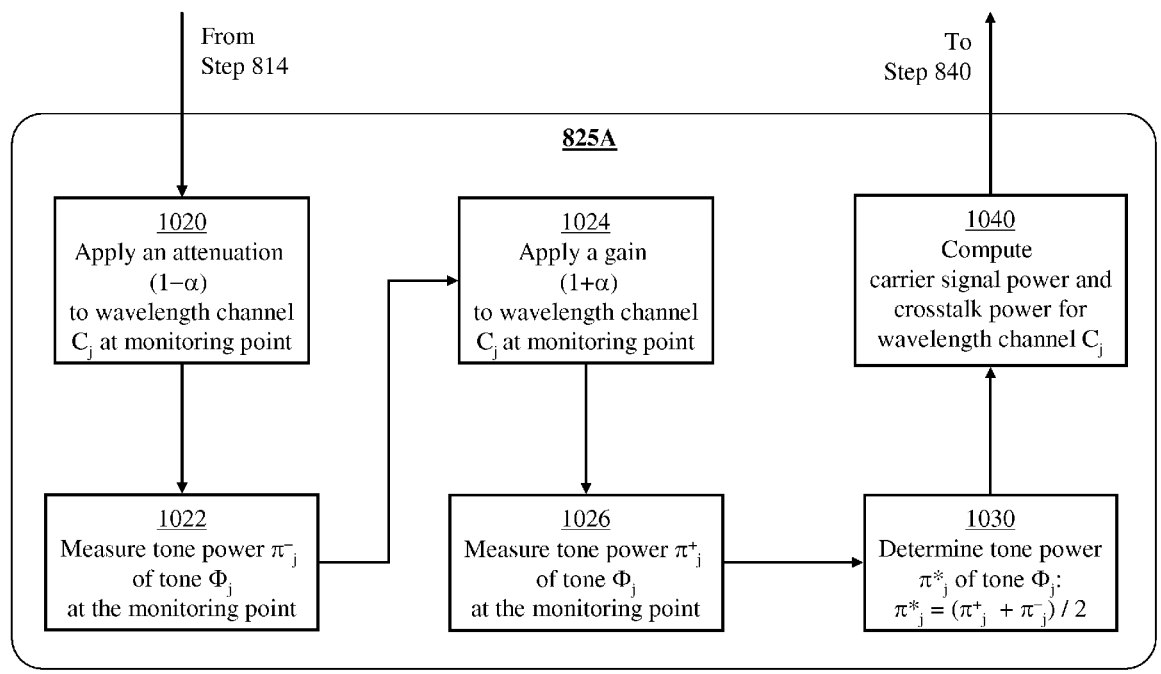
FIG. 10 details an alternative step, in the method of FIG. 8, of measuring response to selective optical-power perturbation and determining carrier power and crosstalk power.

FIG. 10 illustrates an alternate implementation of step 825 (referenced as 825A) of FIG. 8. In step 1020, a temporary attenuation $(1-\alpha)$ is applied to the composite carrier signal of channel $C_j$ and in step 1022 the tone power in frequency band $\Phi_j$ is measured to yield a value $\pi^-_j$. In step 1024, a subsequent temporary gain $(1+\alpha)$ is applied to the unperturbed composite carrier signal of channel $C_j$ and in step 1026 the tone power in frequency band $\Phi_j$ is measured to yield a value $\pi^+_j$. In step 1030, the change in tone power level in frequency band $\Phi_j$ is determined as $\pi^*_j=(\pi^+_j-\pi^-_j)/2$. In step 1040 the carrier power and crosstalk power of both the tone and the carrier signals of the composite carrier signal of channel $C_j$ are computed. Step 1040, to be described below, is quite similar to step 940.

Figure 11:
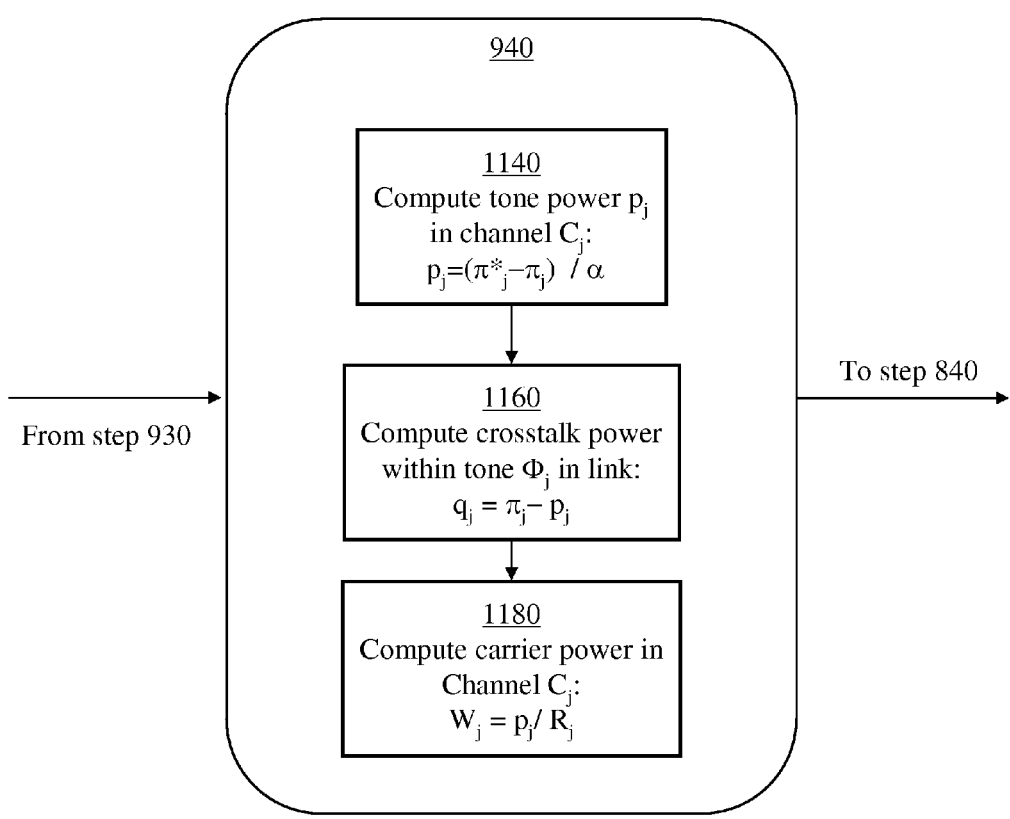
FIG. 11 illustrates computation of carrier power and crosstalk power of a selected carrier in accordance with an embodiment of the present invention.

FIG. 11 details a first implementation of step 940 of FIG. 9. Step 940 is reached from step 930 of FIG. 9 which provides a measurement $\pi^*_j$ of tone power after applying the temporary gain. In step 1140, the power $p_j$ of the tone in frequency band $\Phi_j$ is determined as $p_j=(\pi^*_j-\pi_j)$, and the tone crosstalk power $q_j$ is determined as $q_j=\pi_j-p_j$. In step 1180, the carrier power $W_j$ is determined as $p_j/R_j$, $R_j$ being the ratio of tone power to carrier power of the composite carrier signal of channel $C_j$ at the sending end. It is noted that the selection of the value of $R_j$ may depend on the corresponding carrier wavelength $\lambda_j$, where the composite carrier signal of shortest wavelength (being predominantly a donor of scattered power) is given a higher ratio $R_j$, and generally $R_j>R_k$ for $\lambda_j<\lambda_k$.

Step 1040 of FIG. 10 is similar to step 940 of FIG. 9. The main difference is that the value of $\pi^*j$ is determined as $\pi^*_j=(\pi^+_j+\pi^-_j)/2$. The computation of $p_j$ in step 1040 may alternatively be determined as $p_j=(\pi^+_j-\pi^-_j)/(2\times\alpha)$.

Figure 12:
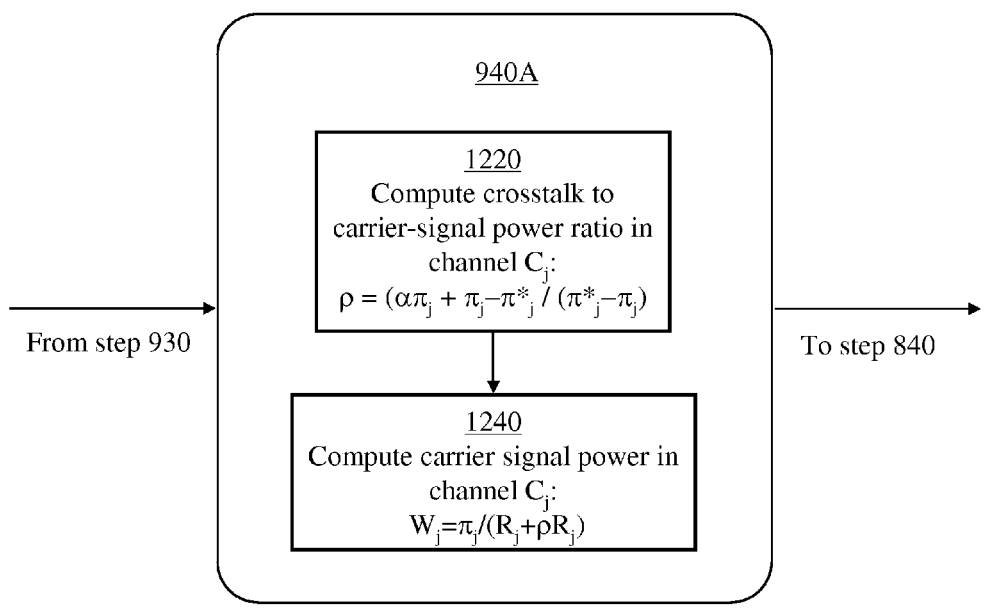
FIG. 12 illustrates an alternate computation of carrier power and crosstalk power of a selected carrier in accordance with an embodiment of the present invention.

FIG. 12 details a second implementation of step 940 (referenced as 940A) of FIG. 9. In step 1120, the ratio $\rho$ of crosstalk power to carrier signal power is determined as: $\rho=(\alpha\pi_j+\pi_j-\pi^*_j)/(\pi^*_j-\pi_j)$. In step 1240 the carrier-signal power is determined as: $W_j=\pi_j/(R_j+\rho R_j)$, $R_j$ being the ratio of tone power to carrier power of the composite carrier signal of channel $C_j$ at the sending end as defined above.

Network-Wide Application of Carrier-Power Measurements

A WDM link connecting two optical switching nodes may comprise more than one span where a span connects any two nodes which may be switching nodes, transmission nodes, or one of each. The method described above applies to (1) a single span within a WDM link, (2) a path traversing several spans belonging to a single WDM link, (3) a path traversing several spans belonging to concatenated WDM links, or (4) to an end-to-end path from a source optical node 120 to a sink optical node 120.

The measurement process described in the present application requires an experimental temporary modification of a composite carrier signal over a link of interest. The level of power modification is judicially selected so as to avoid undue interference in any other carrier signal. Within a single link, only one carrier signal is processed at a time as described above. Applying the power-measurement procedure concurrently to any two composite carrier signals propagating in two different links where the two links have a common composite carrier signal may falsify the measurements, or at least reduce the accuracy of the respective carrier-power estimates. The accuracy of carrier-power estimation may also be reduced even if the two links do not have a common composite carrier signal. This occurs if at least one carrier signal in the first link and at least one carrier signal in the second link share an intermediate link. To ensure accurate measurements, the network controller 160 may schedule the measurements so that only one carrier signal is considered at a time. Alternatively, the network controller 160 may identify groups of links 125 (FIG. 1) each group comprising links 125 that are not directly or indirectly coupled. The links in each group may then be processed concurrently.

Figure 13:
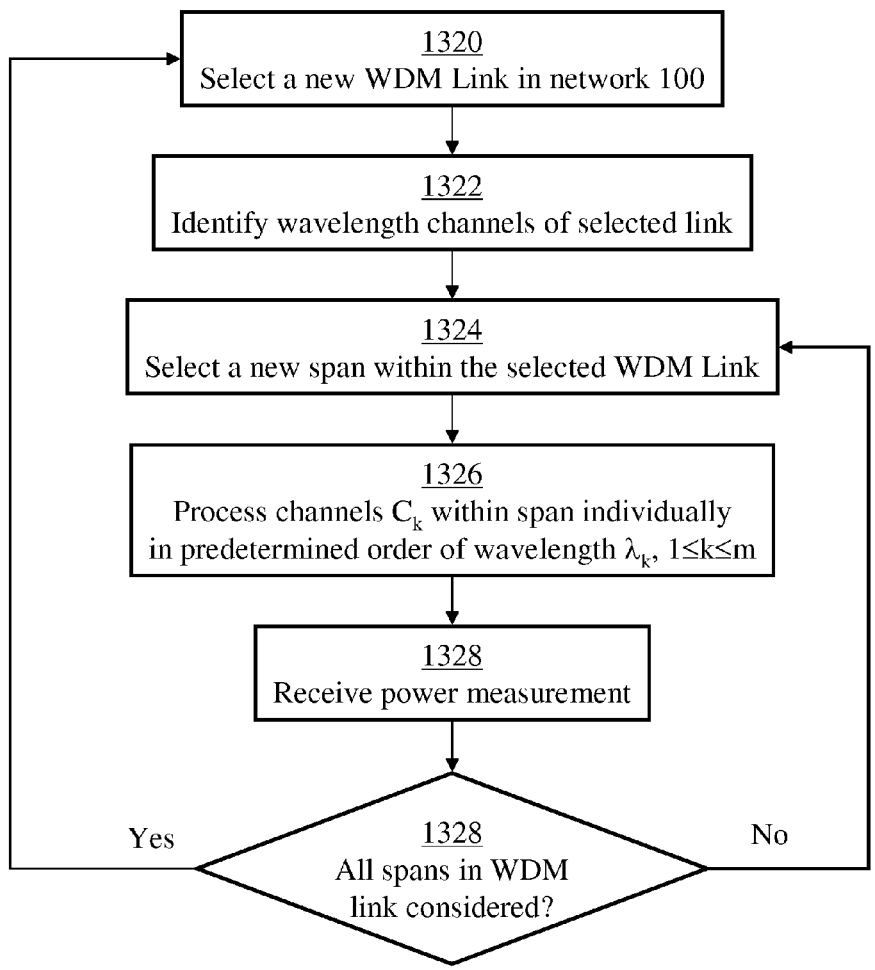
FIG. 13 is a flowchart describing a process executed by a network controller for optical power control of optical-fiber spans across an optical network employing WDM fiber-optic links in accordance with an embodiment of the present invention.

FIG. 13 describes a process executed by a network controller 160 for optical power control of optical-fiber spans across optical network 100. The controller 160 maintains a record for each link 125 with detailed information on the wavelength channels and spans of each link 125. The controller 160 determines an order of processing the spans of interest in network 100. In step 1320, controller 160 selects a link 125 and in step 1322, the wavelength channels of the selected links are identified. In step 1324, the controller 160 selects a span within link 125. In step 1326, controller 160 determines a specific order of processing the wavelength channels. In step 1328, controller 160 receives power measurements and/or an estimated carrier-signal power for a currently considered wavelength channel from a local controller (local controller 490 of FIG. 4) to be used for instructing a sending end to adjust power level of the transmitted carried signal if required.

If the link 125 under consideration has one or more spans to be considered, step 1324 is revisited (from step 1328). Otherwise, step 1328 directs the process to step 1320 to select a new WDM link in network 100. The process may execute continuously, thus, when all links 125 have been considered, the first link in the ordered list is revisited.

The links 125 may be arranged in a preferred order for cyclic processing. For example, the links 125 may be ranked according to the number of end-to-end paths traversing each link; an end-to-end-path being a path traversing links from a source optical node 120 to a sink optical node 120. A link shared by a large number of end-to-end-paths, or a link of high traffic occupancy, may be processed ahead of others.

The wavelength channels (equivalently, the composite-carrier signals) may be considered in step 1326 in a favorable order which takes into account the light-scattering properties. For example, a favorable order may be a descending order of wavelengths of the m composite carriers.

Figure 14:
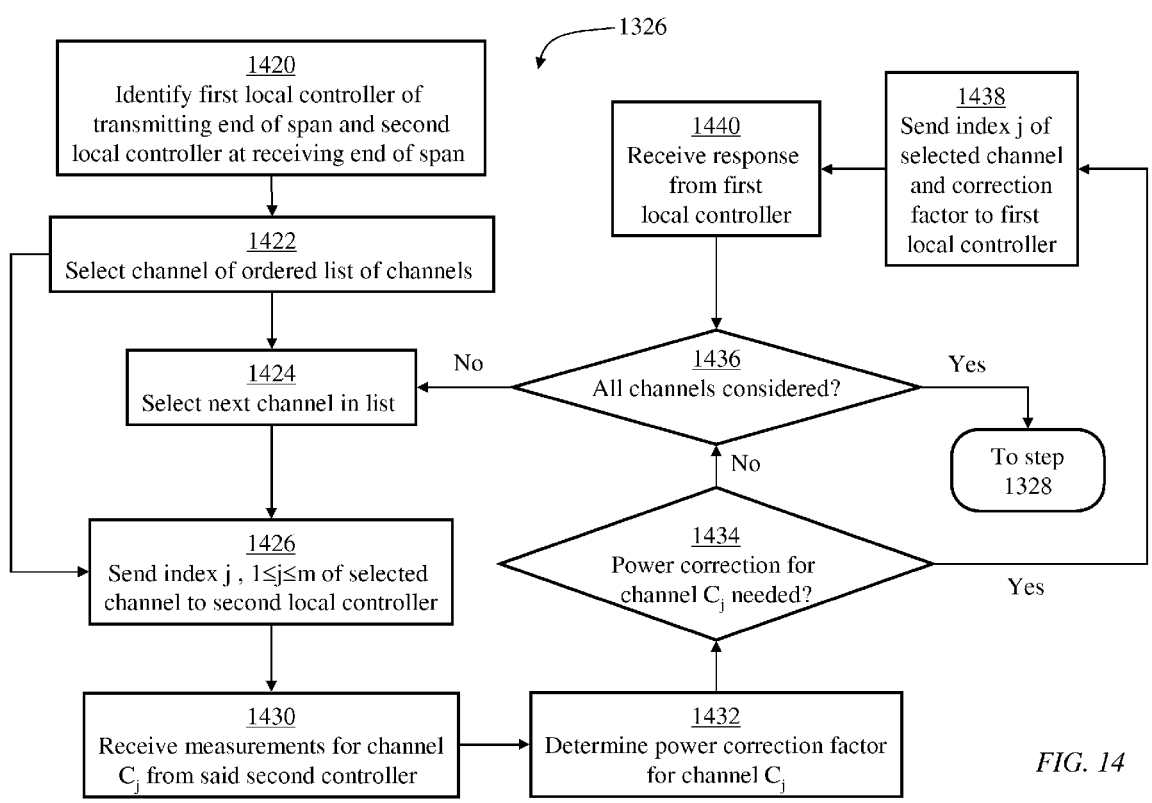
FIG. 14 details a process executed by the network controller for optical-power control of all wavelength channels in a selected span in accordance with an embodiment of the present invention.

FIG. 14 details step 1326. In step 1420 controller 160 identifies a first local controller at the sending end of the selected span and a second local controller (local controller 490, FIG. 4) at the receiving end of the span. In step 1422, controller 160 selects a wavelength channel. In step 1426, controller 160 sends an index j of the selected channel $C_j$ to the second local controller and in step 1430 it receives measurements, and/or an estimate of carrier-signal power for channel $C_j$, from the second local controller. In step 1432, controller 160 determines a power correction factor for channel $C_j$ to be applied at the sending end of the span under consideration. If power correction is to be applied, the index j and the correction factor are sent to the first local controller. In step 1440, controller 160 receives a response from the first local controller indicating that a correction has been applied to channel $C_j$ and step 1436 is executed. If, in step 1434 it is determined that a correction is not needed, step 1436 is executed. If step 1436 determines that all channels of the span under consideration have been considered a subsequent channel from the ordered list is selected in step 1424 and the steps starting with step 1426 and ending in step 1436 are executed again. If step 1436 determines that all wavelength channels have been considered, the process is directed to step 1328 of FIG. 13.

Figure 15:
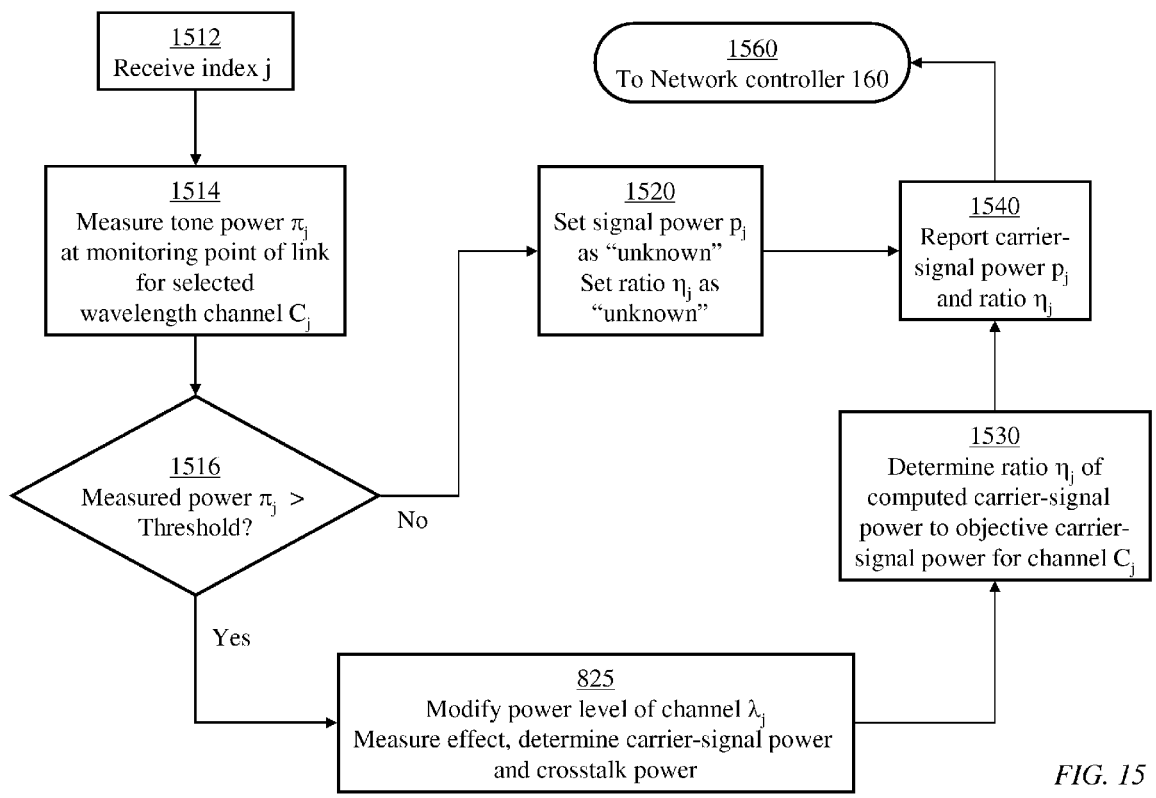
FIG. 15 illustrates a process executed by a local controller of a fiber span for estimating carrier-signal power and determining a correction factor in accordance with an embodiment of the present invention.

FIG. 15 illustrates a process executed by the second local controller (local controller 490 of FIG. 4) of the span under consideration for estimating carrier-signal power and determining the correction factor described above. The second local controller receives from a network controller 160 an index j of a carrier signal to be measured next (step 1512). In step 1514, the power $\pi_j$ of tone $\Phi_j$ is measured. In step 1516, if the measured power $\pi_j$ is found to be insufficient for further processing, step 1520 assigns a default value to $p_j$ and other variables to be reported in step 1540. In step 1516, if the measured power is found to be sufficiently large to permit further processing, the wavelength-selective gain-control device 458 applies a temporary gain to the identified carrier signal and the process described in step 825 of FIG. 8 is executed to compute the carrier-signal power. The second local controller maintains a table of objective carrier-signal power for each carrier signal routed through the monitored link or span. A ratio $\eta_j$ of the computed carrier-signal power to a respective objective power is determined (step 1530) and reported (step 1540), together with the carrier-signal power $W_j$ to the network controller 160 (step 1560). The network controller 160 instructs a controller at the sending end of the monitored link (or span) to adjust power level of the carrier signal.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for measuring signal power in a link in a communications network, said link transporting a plurality of carrier signals each carrier signal carrying a respective information signal where crosstalk among the carrier signals is present, the method comprising:

selecting a specific carrier signal;
modulating said specific carrier signal with an identifying signal to produce a composite signal, with a predefined power ratio of said identifying signal to the specific carrier signal; and
at a monitoring point along said link
   detecting said identifying signal;
   obtaining a first measurement of power of the identifying signal;
   modifying power of said composite signal by a first factor;
   detecting said identifying signal;
   obtaining a second measurement of power of the identifying signal; and
   determining a first estimate of power of said specific carrier signal as a function of said first measurement, said second measurement, said first factor, and said predefined power ratio;
wherein said first factor equals $(1-\alpha)$, where $0<\alpha<1$, and said first estimate is determined as:

(the first measurement−the second measurement)/($\alpha \times R$), where R is said predefined power ratio.

2. The method of claim 1 further comprising:
determining an estimate of crosstalk-power component of said identifying signal detected at said monitoring point as said first measurement minus said first estimate; and
determining an estimate of crosstalk-power component of said specific carrier signal at said monitoring point as said crosstalk-power component of said identifying signal divided by said predefined power ratio.

3. The method of claim 1 further comprising:
modifying said composite signal by a second factor;
detecting said identifying signal;
obtaining a third measurement of power of the identifying signal; and
determining a second estimate of power of said specific carrier signal as a function of said second measurement, said third measurement, said first factor, said second factor, and said predefined power ratio.

4. The method of claim 3 wherein said first factor equals $(1-\alpha)$, said second factor equals $(1+\alpha)$, where $0<\alpha<1$, and said second estimate of power is determined as:

(the third measurement−the second measurement)/($2 \times \alpha \times R$), where R is said predefined power ratio.

5. The method of claim 3 further comprising:
determining an estimate of crosstalk-power component of said identifying signal detected at said monitoring point as said first measurement minus said second estimate; and
determining an estimate of crosstalk-power component of said specific carrier signal at said monitoring point as said crosstalk-power component of said identifying signal divided by said predefined power ratio.

6. The method of claim 3 wherein the obtaining said first measurement, the obtaining said second measurement, and the obtaining said third measurement comprise performing analog spectral analysis.

7. The method of claim 3 wherein the obtaining said first measurement, the obtaining said second measurement, and the obtaining said third measurement comprise analog-to-digital converting and performing digital spectral analysis.

8. The method of claim 7 wherein the performing comprises determining Fast Fourier Transform.

9. The method of claim 1 wherein said link is a fiber-optic link and said each carrier signal is an optical carrier signal.

10. The method of claim 1 wherein said identifying signal is a sinusoidal signal spectrally distinct from said respective information signal of said each carrier signal.

11. The method of claim 1 wherein said identifying signal comprises time-multiplexed sinusoidal signals spectrally distinct from said respective information signal of said each carrier signal.

12. The method of claim 1 further comprising modulating each other carrier signal of the plurality of carrier signals with a corresponding identifying signal.

13. A method for measuring signal power in a link in a communications network, said link transporting a plurality of carrier signals each carrier signal carrying a respective information signal where crosstalk among the carrier signals is present, the method comprising:
selecting a specific carrier signal;
modulating said specific carrier signal with an identifying signal to produce a composite signal, with a predefined rower ratio of said identifying signal to the specific carrier signal; and
at a monitoring point along said link
   detecting said identifying signal;
   obtaining a first measurement of rower of the identifying signal;
   modifying power of said composite signal by a first factor;
   detecting said identifying signal;
   obtaining a second measurement of power of the identifying signal; and
   determining a first estimate of rower of said specific carrier signal as a function of said first measurement, said second measurement, said first factor, and said predefined power ratio;
wherein said first factor equals $(1+\alpha)$, where $\alpha>0$, and said first estimate is determined as:

(the second measurement−the first measurement)/($\alpha \times R$), where R is said predefined power ratio.

14. A method for measuring signal power in a link in an optical network, the link transporting a wavelength-multiplexed signal comprising $m>1$ carrier signals, indexed as 1 to m, each carrier signal carrying a respective information signal where crosstalk among the carrier signals is present, the method comprising:
prior to transmitting a carrier signal of index j, and power $u_j$, $1 \leq j \leq m$, amplitude-modulating said carrier signal with an identifying signal of power $R \times u_j$, $R<1$, to produce a composite signal;
at a monitoring point of said link
   detecting said identifying signal to obtain a detected identifying signal;
   obtaining an initial measurement $\pi_j$ of power of said detected identifying signal;
   modifying power of said composite signal by a first factor $(1+\alpha_j)$, $|\alpha_j| > ă$, and $\alpha_j - 1$, ă being a lower bound of the magnitude of $\alpha_j$;
   obtaining a new measurement $\pi^*_j$ of power of said identifying signal; and
   determining power of said carrier signal of index j as $W_j = (\pi^*_j - \pi_j)/(\alpha_j \times R)$.

15. The method of claim 14 wherein the modifying comprises introducing a predetermined upper bound â and setting $\alpha_j$ to be less than â.

16. The method of claim 14 further comprising sequentially selecting said carrier signal from among said m>1 carrier signals.

17. The method of claim 14 further comprising determining a ratio ρ of crosstalk-power to carrier-signal power of the carrier signal of index j as follows:

$$\rho = (\alpha \pi_j + \pi_j - \pi^*_j)/(\pi^*_j - \pi_j)$$

18. The method of claim 14 further comprising determining a power correction factor for said composite signal as a ratio of a predefined objective power level to said power $W_j$.

19. A system for measuring signal power in a link in a communications network, the link transporting m>1 carrier signals carrying respective information signals, where crosstalk among the carrier signals is present, the system comprising:
- an amplitude modulator (416) for modulating a carrier signal from among said m>1 carrier signals with an identifying signal to produce a composite signal;
- a detector (470) for detecting the identifying signal from the link to obtain a detected identifying signal;
- a signal analyzer (480) for obtaining a power measurement of said detected identifying signal;
- a wavelength-selective gain-control device (458) for modifying power of the composite signal by a controllable factor; and
- a controller (490) communicatively coupled to said wavelength-selective gain-control device (458), and to said signal analyzer (480), said controller (490) for
  - setting a first value of said controllable factor;
  - obtaining, from the signal analyzer (480), a first power measurement of the detected identifying signal corresponding to said first value of the controllable factor;
  - setting a second value of said controllable factor;
  - obtaining, from the signal analyzer (480), a second power measurement of the detected identifying signal corresponding to said second value of the controllable factor;
  - and
  - determining power of said identifying signal in said composite signal as a function of said first value, said first power measurement, said second value, and said second power measurement;
- wherein said amplitude modulator comprises a power-level selector for selecting a power level of said identifying signal to have a predetermined ratio to a power level of the carrier signal; and
- wherein said controller (490) estimates carrier-signal power of said composite signal as said rower of said identifying signal in said composite signal divided by said predetermined ratio.

20. The system of claim 19 wherein said first value is 1.0, said second value is (1+α), and said power of said identifying-signal component is determined as:

ρ=(said second power measurement−said first power measurement)/α, where α>1 and the magnitude of α exceeds a predefined minimum value.

21. The system of claim 19 wherein said respective identifying signal is a sinusoidal wave of a frequency distinct from a frequency spectrum of said respective information signal of said each carrier signal.

22. The system of claim 19 wherein said respective identifying signal comprises at least two time-multiplexed sinusoidal waves of frequency content distinct from a frequency spectrum of said respective information signal of said each carrier signal.

23. The system of claim 19 wherein said wavelength-selective gain-control device is incorporated in a reconfigurable optical add-drop multiplexer.

24. The system of claim 19 wherein said wavelength-selective gain-control device is incorporated in a wavelength-selective optical switch.

25. The system of claim 19 wherein said detector is an analog amplitude detector and said signal analyzer comprises:
- a signal sampler for obtaining samples of said detected identifying signal;
- an analog-to-digital converter for converting said samples into digital data; and
- a processor for performing discrete transform of the digital data.

26. A method for controlling signal power in an optical network comprising a plurality of optical nodes interconnected by a plurality of links, each link transporting a respective plurality of composite signals, each composite signal being a carrier signal modulated by a respective tone, and each link having at least one monitoring device with a collocated gain-control device, the method comprising:
- selecting a link;
- selecting a monitoring device of said link;
- at said monitoring device
  - selecting a specific composite signal, modulated by a specific tone, from a set of composite signals carried by said link;
  - obtaining a first measurement of power in said link of said specific tone;
  - modifying power of said specific composite signal by a specific factor;
  - obtaining a second measurement of power in said link of said specific tone;
  - determining power of said specific tone in said specific composite signal as a function of said first measurement, said second measurement, and said specific factor;
  - determining an estimate of power of a carrier signal of said specific composite signal according to a predefined power ratio of said tone to said carrier signal; and
  - determining a correction factor of power level of said specific composite signal as a ratio of an objective power level to said estimate of power;
- wherein said specific factor equals (1+α), where −1<α<â, and |α|>ă, â being a predefined upper bound and ă being a predefined lower bound, and said estimate of power of said carrier signal is determined as (π*−π)/(α×R), where π* is said second measurement, π is said first measurement, and R is said predefined power ratio.

27. The method of claim 26 further comprising adjusting a power level of said specific composite signal, according to said correction factor, at a point in said link preceding said monitoring device.

28. The method of claim 26 further comprising arranging said respective plurality of composite signals of said each link in a specific order and the step of selecting a specific composite signal is performed sequentially according to the specific order.

29. The method of claim 28 wherein said specific order is a descending order of wavelengths of said set of composite signals.

30. A method for controlling signal power in an optical network comprising a plurality of optical nodes interconnected by a plurality of links, each link transporting a respective plurality of composite signals, each composite signal being a carrier signal modulated by a respective tone, and each link having at least one monitoring device with a collocated gain-control device, the method comprising:

selecting a link;

selecting a monitoring device of said link;

at said monitoring device selecting a specific composite signal, modulated by a specific tone, from a set of composite signals carried by said link;

obtaining a first measurement of rower in said link of said specific tone;

modifying power of said specific composite signal by a specific factor;

obtaining a second measurement of rower in said link of said specific tone;

determining power of said specific tone in said specific composite signal as a function of said first measurement, said second measurement, and said specific factor;

determining an estimate of power of a carrier signal of said specific composite signal according to a predefined power ratio of said tone to said carrier signal;

determining a correction factor of power level of said specific composite signal as a ratio of an objective power level to said estimate of power;

wherein the selecting said link is performed cyclically according to a predetermined order of link selection; and wherein said predetermined order of link selection is based on a number of end-to-end paths traversing each link in said plurality of links.

31. The method of claim 30 wherein the selecting a monitoring device of said link is performed sequentially.

* * * * *

UNITED STATES PATENT AND TRADEMARK OFFICE
CERTIFICATE OF CORRECTION

| | |
|---|---|
| PATENT NO. | : 7,715,710 B2 |
| APPLICATION NO. | : 11/754675 |
| DATED | : May 11, 2010 |
| INVENTOR(S) | : Ping Wai Wan et al. |

Page 1 of 1

It is certified that error appears in the above-identified patent and that said Letters Patent is hereby corrected as shown below:

Column 18, line 21, "rower" is corrected to read as -- power --.

Column 18, line 25, "rower" is corrected to read as -- power --.

Column 18, line 32, "rower" is corrected to read as -- power --.

Column 19, line 51, "rower" is corrected to read as -- power --.

Column 19, line 60, "$\alpha > 1$" is corrected to read as -- $\alpha > -1$ --.

Column 20, line 51, "âbeing" is corrected to read as -- â being --.

Column 21, line 14, "rower" is corrected to read as -- power --.

Column 21, line 18, "rower" is corrected to read as -- power --.

Signed and Sealed this

Twenty-seventh Day of July, 2010

David J. Kappos
*Director of the United States Patent and Trademark Office*